United States Patent Office 3,423,048
Patented Jan. 21, 1969

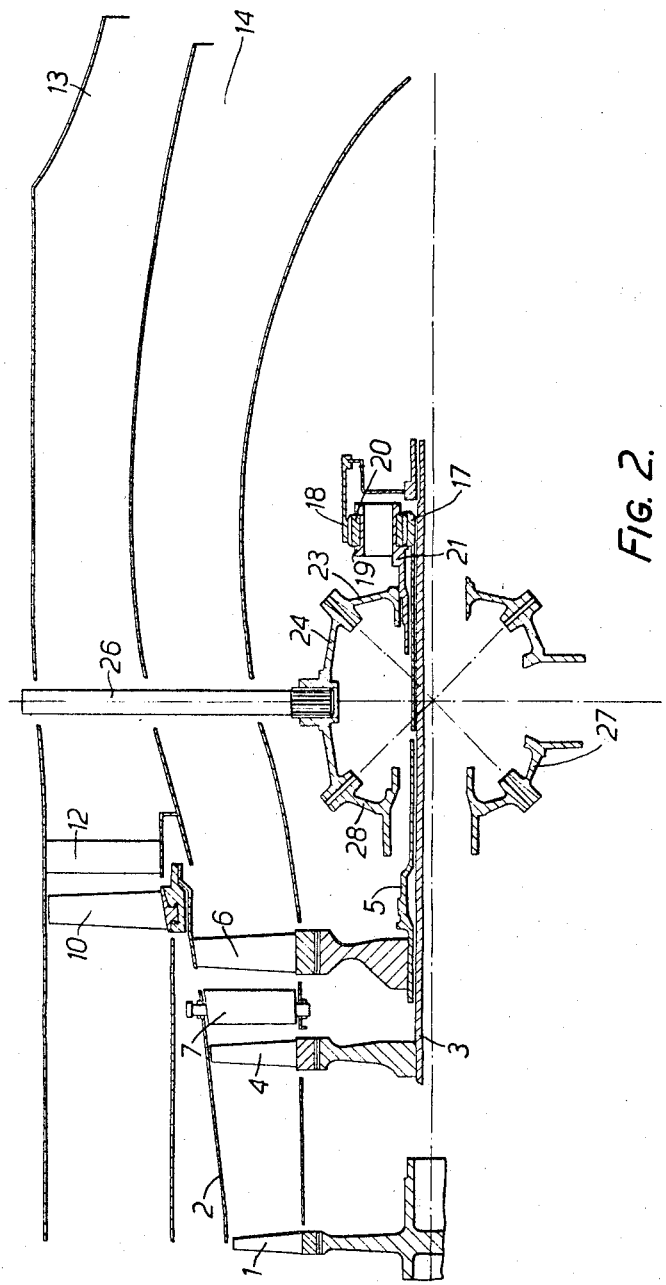

3,423,048
GAS TURBINE COMPOUND HELICOPTER
POWER PLANT
George Frederick Clarke, Stanmore, and Derek Aubrey
Roberts, Bristol, England, assignors to Bristol Siddeley
Engines Limited, London, England, a company of Great
Britain
Filed Nov. 18, 1966, Ser. No. 595,497
U.S. Cl. 244—7                                    4 Claims
Int. Cl. B64c 27/14; F02g 3/10; F02k 3/02

ABSTRACT OF THE DISCLOSURE

The disclosure of this invention pertains to a gas turbine compound helicopter power plant in which the products of combustion drive a first turbine rotor arranged to drive the air compressor and then drive at least one further turbine rotor providing a source of mechanical power for transmitting power to at least one power driven device, such as a lift propeller and in which means are provided for effecting substantial variations in the mechanical power provided.

This invention relates to gas turbine power plants of the kind comprising an air compressor delivering air to combustion chamber apparatus the products of combustion (hereinafter called for convenience the hot gases) from which act on a first turbine rotor arranged to drive the air compressor and then on at least one further turbine rotor providing a source of mechanical power and hereinafter for convenience called a power turbine rotor, arranged to transmit power to at least one power driven device, and has for an object to provide a gas turbine power plant of the above kind which will be particularly suitable for use where it is necessary or desirable to provide for substantial variations in the mechanical power provided, as for example where the power plant is employed in aircraft to drive one or more helicopter rotors or lift fans, or, for example where the power plant is used to drive an electric generator the speed of which has to be maintained constant to maintain constant frequency alternating electrical output, while its power absorption will vary in accordance with the variable electrical demand placed upon it.

A gas turbine power plant according to the present invention comprises an air compressor arranged to deliver air to combustion chamber apparatus the hot gases from which act on a first turbine rotor driving the air compressor, second and third turbine rotors arranged to be acted upon in series by the hot gases after they have acted upon the first turbine rotor, differential gearing comprising two input elements arranged to be driven respectively by the second and third turbine rotors and an output element which constitutes a power output member, and control means arranged to regulate the gas flow between the second and third turbine rotors and thereby vary the relationship between the power outputs of these two turbine rotors.

For convenience herein the control means which regulate the gas flow between the second and third turbine rotors will be referred to as an adjustable nozzle ring.

The second and third turbine rotors preferably rotate in the same direction.

In most cases a gas turbine power plant according to the invention will also include means (hereinafter called additional power transmitting means) for transmitting power directly from the second or third turbine rotor to one or more power driven devices.

Thus in one application of the invention to a helicopter type aircraft, while the power output member of the differential gearing is arranged to drive at least one helicopter rotor such additional power transmitting means are arranged to transmit power directly to a fan rotor arranged to deliver air to at least one propulsion nozzle, thus providing a type of power plant of the kind often referred to as a compound helicopter engine.

In this case, and in other applications of the invention incorporating additional power transmitting means the gas control by the adjustable nozzle ring may be such as to enable the speed of the turbine rotor which is connected by the additional power transmitting means to the fan or other power driven device or devices to be reduced to zero if and when desired.

A further application of a power plant according to the invention incorporating additional power transmitting means is to an air cushion type vehicle in which case the output member of the differential gearing may drive a fan or fans providing air to maintain the air cushion while the additional power transmitting means are arranged for direct transmission of power to a further fan for delivering air to one or more propulsion nozzles.

In a still further application of a power plant according to the invention, to an aircraft wherein the power plant incorporates additional power transmitting means, the output member of the differential gearing may drive a fan operating in a duct as a lift fan while the additional power transmitting means is arranged to drive a fan for delivering air to one or more nozzles for jet propulsion purposes.

One construction according to the invention as applied to a power plant for a helicopter is shown by way of example in the accompanying drawings in which;

FIGURE 2 is a diagram based on FIGURE 1 and showing in simplified manner the essential features of the power plant.

Figure 1:
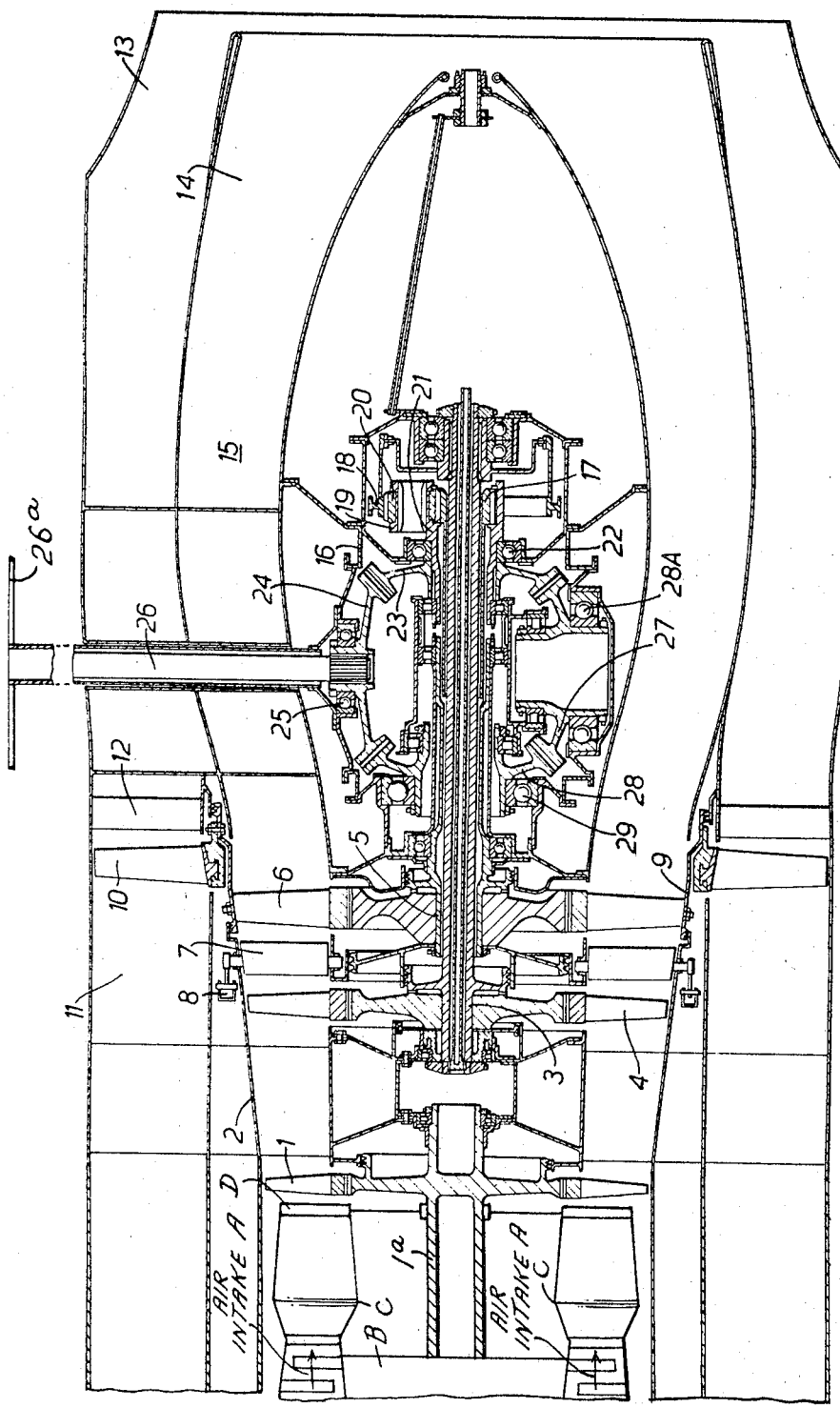
FIGURE 1 is a sectional side elevation of the power plant.

In the construction illustrated the reference numeral 1 indicates the turbine rotor of a convention combustion turbine assembly comprising a compressor the rotor of which would be driven from the turbine rotor 1 and deliver air in known manner to combustion apparatus which is situated between the compressor rotor and the turbine rotor 1 and arranged to deliver hot gases through a conventional nozzle ring to the turbine rotor 1 which thus drives the compressor rotor. As indicated the power plant comprises a main casing shown generally at 2 the forward part of which encloses and supports the turbine rotor 1 mounted on a shaft 1a, an air intake A, a compressor B on shaft 1a, combustion chamber apparatus C and a fixed nozzle ring D all in conventional manner. Supported on bearings for rotation within the rear part of the casing 2 is an inner shaft 3 supporting near its forward end a second turbine rotor 4 while similarly supported on bearings in the rear part of the casing 2 is an outer shaft 5 coaxial with the shaft 3 and carrying near its forward end a third turbine rotor 6. Interposed between the turbine rotors 4 and 6 is an adjustable nozzle ring 7 in the form of a ring of vanes which are adjustable by means of mechanism indicated generally at 8.

Mounted on the tips of the blades of the turbine rotor 6 is a tubular member 9 constituting in effect both a power transmitting member and the hub of a fan to which power is to be transmitted from the turbine rotor 6. To this end the member 9 carries a ring of fan blades 10 disposed in an annular air duct 11 so as to impel air therethrough rearwardly past a ring of fixed straightener blades 12 to a "cold" propulsion nozzle 13, which surrounds a further "hot" propulsion nozzle 14 to which the products of combustion flow through a nozzle passage 15 after acting on the turbine rotors 1, 4 and 6.

The shafts 3 and 5 extend into a gear casing 16 supported from the inner wall of the duct 15 and containing differential gearing of the epicyclic type comprising a sun wheel 17 mounted on the rear end of the shaft 5, a toothed annulus 18 connected to the rear end of the shaft 3, and a planet carrier 19 carrying planet wheels 20 interposed between and meshing with the sun wheel 17 and the toothed annulus 18. The planet carrier 19 is rigidly secured to a sleeve 21 supported in bearings 22 within the casing 16 and having rigidly mounted on its forward end a bevel wheel 23 which meshes with a bevel wheel 24 supported in bearings 25 in the casing 16 and connected to the lower end of a vertical shaft 26 constituting the output shaft which drives a helicopter rotor 26a or rotors through appropriate reduction gearing. The bevel wheel 23 also meshes with a further bevel wheel 27 which is coaxial with the bevel wheel 24 and is supported in bearings 28A in the casing 16, and the bevel wheel 27 in turn meshes with a bevel wheel 28 which is coaxial with the bevel wheel 23, is supported in bearings 29 and itself meshes with the bevel wheel 24 at a point diametrically opposite to the point of intermeshing between the bevel wheel 24 and the bevel wheel 23.

The bearing 25 may allow for a degree of radial float to ensure approximately equal division of the torque transmitted to the bevel wheel 24 between the bevel wheels 23 and 28.

When the power plant is installed in a helicopter type aircraft the pilot would normally be provided with the usual collective pitch control for the helicopter rotor blades and in addition would be provided with a control for the mechanism 8 by which the variable nozzle ring 7 is controlled, while the supply of fuel to the combustion apparatus would be under the control of automatic fuel control apparatus including means responsive to the speed of the helicopter rotor and constructed and arranged, in a manner known per se, so as to tend to maintain the rotational speed of the helicopter rotor constant.

In an application of the invention to a power plant for driving auxiliary apparatus in an aircraft the general arrangement of the power plant itself could be similar to that described with reference to FIGURES 1 and 2 but with the shaft 26 arranged to drive an electric generator at constant speed irrespective of variation in load while the power plant would be modified to omit the fan 9, 10 and the ducting and guide blades associated with it and provide means by which the shaft 5 drives accessories such as pumps for fuel and a lubricating system.

Similarly if a power plant constructed in general as described with references to FIGURES 1 and 2 were employed for use in a cushion type vehicle the shaft 26 could be arranged to drive a fan or fans providing air to maintain the air cushion while the fan 10 could be arranged to provide air for one or more propulsion nozzles, it being unnecessary in this case for the shaft 26 to be maintained at constant speed.

Again in a further application of a power plant generally similar to that described with reference to FIGURES 1 and 2 the shaft 26 might be arranged to drive a lift fan operating in a duct, and not necessarily at a constant speed while the fan 10 could be arranged to provide air for one or more nozzles for jet propulsion purposes.

In a modification of the power plant shown in the drawings the turbine rotor 4 could be arranged to drive a fan rotor having blades extending across the duct 11 while the fan rotor 9, 10 is omitted.

What we claim as our invention and desire to secure by Letters Patent is:

1. A gas turbine power plant for a helicopter aircraft comprising an air compressor, combustion apparatus, arranged to receive such air, a first turbine rotor arranged to be acted upon by the hot gases from the combustion apparatus and driving the air compressor, second and third turbine rotors arranged to be acted upon in series by the hot gases after they have acted upon the first turbine rotor, differential gearing comprising two input elements arranged to be driven respectively by the second and third turbine rotors and an output element constituting a power output member, control means arranged to regulate the gas flow between the second and third turbine rotors and thereby regulate the relationship between the power outputs of these two turbine rotors, additional power transmitting means arranged to transmit power directly from one of the rotors comprising the second and third turbine rotors to one or more power driven devices, and a fan rotor delivering air to at least one jet propulsion nozzle in which the power output member of the differential gearing is arranged to drive at least one helicopter rotor and including the additional power transmitting means driving the fan rotor.

2. A gas turbine power plant as claimed in claim 1 in which the gas control means between the second and third turbine rotors is such as to enable the speed of the turbine rotor which is directly connected to the fan rotor to be reduced substantially to zero.

3. A gas turbine power plant for an air cushion type vehicle comprising an air compressor, combustion apparatus, arranged to receive such air, a first turbine rotor arranged to be acted upon by the hot gases from the combustion apparatus and driving the air compressor, second and third turbine rotors arranged to be acted upon in series by the hot gases after they have acted upon the first turbine rotor, differential gearing comprising two input elements arranged to be driven respectively by the second and third turbine rotors and an output element constituting a power output member, control means arranged to regulate the gas flow between the second and third turbine rotors and thereby regulate the relationship between the power outputs of these two turbine rotors, additional power transmitting means arranged to transmit power directly from one of the rotors comprising the second and third turbine rotors to one or more power driven devices, and a first fan providing air for maintaining the air cushion, and a second fan for delivering air to at least one jet propulsion nozzle wherein the output member of the differential gearing drives the first fan and the additional power transmitting means drives the second fan.

4. An aircraft embodying a gas turbine power plant comprising an air compressor, combustion apparatus, arranged to receive such air, a first turbine rotor arranged to be acted upon by the hot gases from the combustion apparatus and driving the air compressor, second and third turbine rotors arranged to be acted upon in series by the hot gases after they have acted upon the first turbine rotor, differential gearing comprising two input elements arranged to be driven respectively by the second and third turbine rotors and an output element constituting a power output member, control means arranged to regulate the gas flow between the second and third turbine rotors and thereby regulate the relationship between the power outputs of these two turbine rotors, additional power transmitting means arranged to transmit power directly from one of the rotors comprising the second and third turbine rotors to one or more power driven devices, and a lift fan, a further fan, and at least one propulsion nozzle receiving air from said further fan wherein the output member of the differential gearing drives the lift fan and the additional power transmitting means is arranged to drive air to the further fan.

References Cited

UNITED STATES PATENTS

| 2,937,495 | 5/1960 | Perry | 60—226 |
| 3,038,307 | 6/1962 | Oprecht | 60—39.16 |

JULIUS E. WEST, *Primary Examiner.*

U.S. Cl. X.R.

60—39.16, 226; 244—17.11; 253—39